March 3, 1964  K. V. MATTHEWS  3,123,660
PROGRAMMED SLIT CONTROL FOR ANALYZERS
Filed Nov. 21, 1960
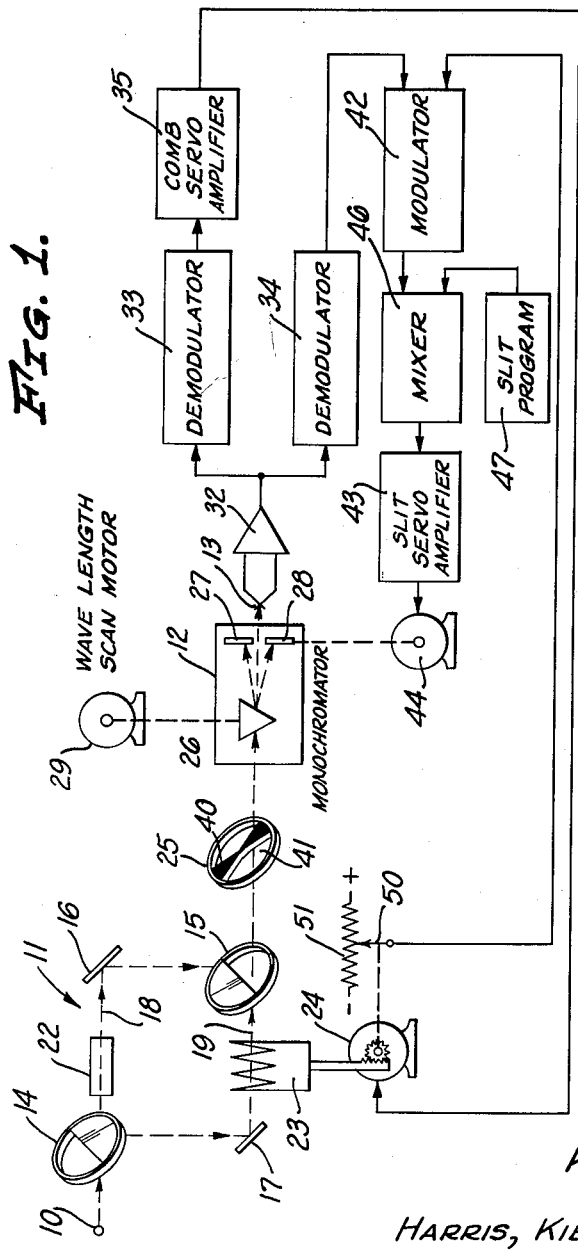
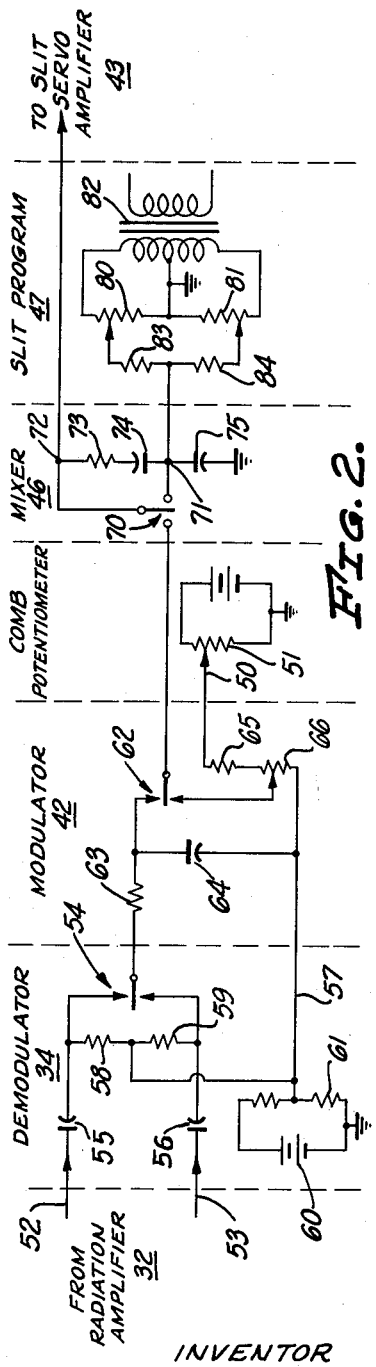
INVENTOR
KENNETH V. MATTHEWS.
BY HIS ATTORNEYS
HARRIS, KIECH, RUSSELL & KERN United States Patent Office 3,123,660
Patented Mar. 3, 1964

3,123,660
PROGRAMMED SLIT CONTROL FOR ANALYZERS
Kenneth V. Matthews, Garden Grove, Calif., assignor to Beckman Instruments, Inc., a corporation of California
Filed Nov. 21, 1960, Ser. No. 70,734
8 Claims. (Cl. 88—14)

This invention relates to analyzers of the double beam, optical null type such as spectrophotometers utilizing beam intensity balancing, and in particular, to new and improved apparatus for operation of such instruments at very low values of transmittance.

In analyzers of this type, radiation from a source is switched along two paths and recombined at a thermocouple or other electrical signal generator. A sample to be analyzed is placed in one path and the error signal is used to drive a servo which varies the intensity of the beam in the other path to achieve a null or zero signal at the thermocouple. The servo position is a measure of the sample content. Ordinarily, the wavelength of the radiation source is scanned over a range by a monochromator during the measurement to provide a spectrum measure of the sample. The monochromator includes one or more slits for controlling the bandwidth of the radiation beam leaving the monochromator and for controlling the total energy in the beam. Such analyzers ordinarily include means for varying the slit width as a function of wavelength to compensate for the black body radiation curve and for other energy variations with wavelength, thus keeping the slits at reasonable widths at all times. Alternatively, the slit width may be automatically controlled as a function of total energy in the beam to maintain the gain of the attenuator drive loop constant for any setting of the attenuator position. A typical instrument is described in the copending application of Karl E. Sundstrom, entitled Automatic Slit Control for Analyzers, Serial No. 70,733, filed November 21, 1960, and assigned to the same assignee.

In instruments of this type utilizing automatic slit control, the magnitude of the signal for driving the slit servo amplifier for a given percentage of change in background energy is a function of the transmittance of the sample and hence of the position of the attenuator. For very small values of transmittance, the driving signal to the slit servo becomes too small to drive the slit jaws even with large percentages of change in background energy. For zero transmittance, there is no slit servo driving signal and the slit servo loop is susceptible to spurious weak signals picked up from other sources. Under these conditions, the slit jaws drift and sometimes close or open completely, providing slit widths inappropriate to the existing beam energy.

Various approaches have been used in attempting to overcome these disadvantages but unsuccessfully. In one apparatus, the slit jaws are driven only as a function of wavelength and the attenuator loop gain is controlled by varying amplifier gain rather than by varying slit width. However, the signal-to-noise ratio in such systems is greater than that in the slit width control systems. In another approach, an adjustable balancing voltage was injected into the circuit to correct slit drift. This arrangement required close attention from the operator and resulted in energy unbalances in the instrument causing oscillation and dead spots.

It is an object of the present invention to provide an automatic slit control spectrophotometer in which the slit control system is fully operable over the entire range of sample transmittance, i.e., from zero to one hundred percent transmittance. A further object is to provide such an instrument wherein drift and dead spots in the slit control loop are eliminated, even for zero transmittance. A further object is to provide such an instrument which may be utilized for automatic slit control or programmed slit control as desired by the operator.

It is an object of the invention to provide a double beam, optical null analyzer having a reference beam path attenuator control loop for varying the attenuator position as a function of transmittance through the sample, and a slit control loop for varying the slit jaw position as a function of total energy in the combined beam path, with the slit control loop including means for generating a total energy signal as a function of total energy in the combined beam path, slit jaw drive means for varying the slit width, a source for producing a slit program signal which varies in a predetermined manner, and means for combining a portion of the slit program signal with the total energy signal as an input to the drive means, with the portion being of a magnitude to control the slit width for low values of transmittance through the sample. A further object is to provide such an instrument wherein the source for producing the slit program signal is the slit programmer which is operated in synchronism with the wavelength scan of the monochromator. Another object is to provide such an instrument wherein the slit width may be controlled solely by the slit programmer or by the slit control loop as selected by the operator for the particular measurement being conducted.

It is a specific object of the invention to provide such an analyzer wherein the slit control loop is controlled by the total energy signal for the major portion of the transmittance range, with the selected portion of the slit program signal being of a magnitude to control the slit control loop when the transmittance is low, such as when the transmittance is in the range of three to five percent or smaller.

It is an object of the invention to provide an analyzer having a reference beam path attenuator control loop and a slit control loop, with the slit control loop including means for generating an attenuator signal which varies as a function of attenuator position, means for generating a total energy signal as a function of total energy in the combined beam path, a source for producing a slit program signal which varies in a predetermined manner, a slit control circuit having the total energy and attenuator signals as inputs and producing an output varying as a difference of the inputs, and means for combining a portion of the slit program signal with the output signal as an input to the slit jaw drive means.

The invention also comprises novel details of construction and novel combinations and arrangements of parts, which will more fully appear in the course of the following description. The drawing merely shows and the description merely describes a preferred embodiment of the present invention which is given by way of illustration or example.

In the drawing:

FIG. 1 is a block diagram of a spectrophotometer incorporating the slit control of the invention; and FIG. 2 is a schematic diagram of a preferred circuit for the slit control.

The invention will be described herein as it is incorporated in the spectrophotometer described in the aforesaid copending application of Sundstrom. The reference numerals used in the present specification (except for the mixer and slit program units) correspond to those of the copending application and reference may be had to said copending application for the details of construction and operation of the instrument.

The instrument of FIG. 1 includes a source 10, a beam switching system 11, a monochromator 12 and a thermocouple 13. The source 10 may be any suitable device which produces radiation over the spectrum being analyzed. The beam-switching system includes half mirrors 14, 15 which are rotated in synchronism, and reflecting mirrors 16, 17, providing a sample beam path 18 and a reference beam path 19. A sample cell 22 is positioned in the sample beam path 18 for containing the sample to be analyzed. Means for varying the intensity of the beam along the reference beam path 19 is positioned therein. A typical example is the attenuator or comb 23 which is driven into and out of the reference beam path by a motor 24.

A beam interrupter in the form of a segmented disc or chopper 25 is positioned between the half mirror 15 and the monochromator 12. Any other means for interrupting or chopping the total energy beam, such as the alternatives described in the aforesaid copending application of Sundstrom, would be satisfactory as a substitute for the disc 25. The monochromator 12 includes means for dispersing the beam passing therethrough, shown here as a prism 26, and slit jaws 27, 28 defining a slit which permits only a small fraction of the dispersed beam to impinge on the thermocouple 13. The prism 26 is rotated by a scan motor 29 during the analysis to scan the entire spectrum of interest past the slit. A programmed change in scan speed over the spectrum is usually desired and is conventionally accomplished by coupling the motor to the prism or other dispersing element by means of a cam of appropriate contour.

The thermocouple 13 produces an electrical signal which is a function of the intensity of radiation impinging thereon. This signal is amplified in an amplifier 32 and is coupled to demodulators 33, 34. The electrical signal includes a first component which varies as a function of the difference in the energy in the reference path and the energy in the sample path. The demodulator 33 is operated in synchronism with the beam-switching drive for the mirrors 14, 15, ordinarily at the same frequency and phase, and produces an output signal which is a function of the first component. In a typical instrument, the beam switching frequency is at a rate of about five to twenty cycles per second and the demodulator 33 will be in the form of a mechanical chopper. The output from the demodulator 33 is amplified in comb servo amplifier 35 and used to energize the comb motor 24 for driving the comb 23 into and out of the reference path 19 to balance the energy in the two paths and reduce the first component of the signal to zero or a null value. The position of the comb is then a measure of the attenuation produced by the sample. With the exception of the beam interrupter 25 and the demodulator 34, the apparatus described above comprises a conventional double beam, optical null spectrophotometer.

The beam interrupter 25 has solid or opaque sections 40 and open or transparent sections 41, with the solid sections being small relative to the open sections. In one mode of operation, the beam interrupter 25 is operated at double the frequency of the beam switching half mirrors 14, 15. Then the electrical signal generated by the thermocouple 13 includes a second component which varies as a function of the total energy in the combined reference and sample paths. The demodulator 34 is operated in synchronism with the drive for the beam interrupter 25, i.e., at double the frequency of the demodulator 33, and produces an output signal which is compared with a reference signal in a modulator 42. The output of the modulator 42 is connected as one input to a mixer 46. The output of the mixer is coupled to a slit servo amplifier 43 for actuating a slit jaw servo motor 44 which drives the slit jaws 27, 28 to vary the slit width in the monochromator. The second input to the modulator 42 is a reference voltage which comes from the arm 50 of a potentiometer 51, the arm 50 being driven by the comb servo motor 24 so that the reference voltage varies with the position of the attenuator comb in the reference beam path. The second input to the mixer 46 is the slit program signal which comes from a slit program unit 47. The slit program unit may be driven by the wavelength scan motor 29 to produce the slit program signal which varies as a function of the wavelength of the output from the monochromator. The mixer 46 will include a switch which selects either the signal from the modulator 42 or the program signal from the program unit 47 for driving the slit servo amplifier 43.

A preferred circuit for the demodulator 34, the modulator 42, the mixer 46 and the slit program unit 47 is shown in FIG. 2.

The output from the amplifier 32 appears on lines 52, 53 which are coupled to the fixed contacts of a chopper 54 through capacitors 55, 56 respectively. The fixed contacts of the chopper 54 are connected to a reference point 57 through resistors 58, 59. The reference point 57 is maintained at +0.5 volt with respect to circuit ground by a voltage source 60 and a tapped resistor 61. This positive bias for the demodulator is utilized because the arm 50 of the comb potentiometer 51 produces a minimum reference voltage of 0.5 volt for zero transmission along the reference beam path. Of course, a zero reference voltage for zero transmission or any other reference voltage for zero transmission could be utilized.

The output of the demodulator 34 appears at the moving arm of the chopper 54 and is connected to one fixed contact of a chopper 62 through a resistor 63, with a filter capacitor 64 connected across the demodulator output.

The moving arm 50 of the comb potentiometer 51 is connected to the reference point 57 through a fixed resistor 65 and another potentiometer 66. The arm of the potentiometer 66 is connected to the other fixed contact of the chopper 62 to provide the reference voltage for the modulator. The output of the modulator appears at the moving arm of the chopper and is connected to one fixed contact of a switch 70 in the mixer 46.

In the mixer 46, the moving arm of the switch 70 is connected as the input to the slit servo amplifier 43. The other fixed contact of the switch is connected to a junction point 71 to which the slit program signal is also connected. A portion of the slit program signal appearing at the point 71 is directly coupled to the mixer output at point 72. This is accomplished in the circuit of FIG. 2 by a series resistance-capacitance circuit including a resistor 73 and a capacitor 74. A phasing capacitor 75 may be coupled between the point 71 and circuit ground.

With the moving arm of the switch 70 positioned to the right as seen in FIG. 2, the slit program signal is directly connected to the slit servo amplifier and the instrument is operated in the conventional manner with the slit width being a function only of wavelength. For this condition, the series resistance-capacitance circuit does not affect the operation as its impedance is very high. Typically, with a sixty cycle per second slit program signal, the capacitors 74 and 75 are 0.047 microfarad and the resistor 73 is 3.9 megohms.

With the moving arm of the switch 70 to the left, the slit servo loop is completed and the instrument functions to maintain the loop gain of the attenuator loop constant as described more fully in the copending Sundstrom application. When in this condition, a small portion of the slit program signal is coupled from the point 71 to the input of the slit servo amplifier 43 through the series resistance-capacitance circuit. For the major portion of the transmittance range, the magnitude of the signal from the modulator is large relative to the slit program signal so that the slit servo loop operation is substantially independent of the slit program signal. However, for the very low transmittance range, the error signal from the modulator 42 is quite small and for zero transmittance, the error signal falls substantially to zero. Under these circumstances, the portion of the slit program signal coupled to the slit servo input takes over control of the slit servo, preventing drift and an open input to maintain the slit width under control during the low transmittance period. In most applications of the invention, the relative magnitudes of the signal from the modulator and the signal from the reference point 71 which are mixed at the point 72 will be selected so that the slit program signal will become effective when the transmittance falls to about three to five percent.

A typical slit program unit is shown in FIG. 2. A slit servo follow-up potentiometer 80 and a wavelength potentiometer 81 are connected in series across the secondary of a transformer 82. The center tap of the secondary and the junction point of the potentiometers 80, 81 are connected to circuit ground. The arm of the potentiometer 80 is connected to the junction point 71 through a resistor 83 and the arm of the potentiometer 81 is connected to the same junction point through a resistor 84. The arm of the potentiometer 80 is driven by the slit servo which also drives the slit jaws. The arm of the potentiometer 81 may be driven by the wavelength scan motor 29 with the function of the potentiometer selected to provide the desired total energy for the particular wavelength being measured.

In the specific slit program unit 47 shown in FIG. 2, the secondary of the transformer 82 provides 10 volts at sixty cycles per second, the potentiometers 80, 81 are 1000 and 15,000 ohms, respectively, and the resistors 83, 84 are 1 megohm.

The apparatus described above provides a slit control loop having a mixed input signal which functions to maintain the loop gain of the attenuator loop constant while eliminating the need for slit balancing voltages and manual adjustments thereof and permitting operation of the slit control loop at very low and zero transmittance conditions.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. A double beam, optical null analyzer having a reference beam path attenuator control loop for varying the attenuator position as a function of transmittance through the sample, and a slit control loop for varying the slit jaw position as a function of total energy in the combined beam path, with the slit control loop including in combination: means for generating a total energy signal as a function of total energy in the combined beam path; slit jaw drive means for varying the slit width; a source for producing a slit program signal which varies in a predetermined manner; and means coupled to said generating means and said source for combining a portion of said slit program signal with said total energy signal as an input to said drive means, with said portion being of a magnitude to control the slit width for low values of transmittance through the sample.

2. A double beam, optical null analyzer having a reference beam path attenuator control loop for varying the attenuator position as a function of transmittance through the sample down to substantially zero percent transmittance, and a slit control loop for varying the slit jaw position as a function of total energy in the combined beam path, with the slit control loop including in combination: means for generating a total energy signal as a function of total energy in the combined beam path; slit jaw drive means for varying the slit width; a source for producing a slit program signal which varies in a predetermined manner; and means coupled to said generating means and said source for combining a portion of said slit program signal with said total energy signal as an input to said drive means, with said portion being of a magnitude to control the slit width for less than three percent transmittance through the sample.

3. A double beam, optical null analyzer having a reference beam path attenuator control loop for varying the attenuator position as a function of transmittance through the sample, and a slit control loop for varying the slit jaw position as a function of total energy in the combined beam path, with the slit control loop including in combination: means for generating a total energy signal as a function of total energy in the combined beam path; slit jaw drive means for varying the slit width; a source for producing a slit program signal which varies in a predetermined manner as a first input to said drive means; means coupled to said generating means and said source for combining a portion of said slit program signal with said total energy signal as a second input to said drive means, with said portion being of a magnitude to control the slit width for low values of transmittance through the sample; and switch means for selectively connecting said first and second inputs to said drive means.

4. A double beam, optical null analyzer having a reference beam path attenuator control loop for varying the attenuator position as a function of transmittance through the sample, and a slit control loop for varying the slit jaw position as a function of total energy in the combined beam path, with the slit control loop including in combination: means for generating a total energy signal as a function of total energy in the combined beam path; slit jaw drive means for varying the slit width; a source for producing a slit program signal which varies in a predetermined manner as a function of wavelength scanned; and a series resistance-capacitance circiut coupled to said generating means and said source for combining a portion of said slit program signal with said total energy signal as an input to said drive means, with said portion being of a magnitude to control the slit width for low values of transmittance through the sample.

5. A double beam, optical null analyzer having a reference beam path attenuator control loop for varying the attenuator position as a function of transmittance through the sample, and a slit control loop for varying the slit jaw position as a function of total energy in the combined beam path, with the slit control loop including in combination: means for generating a total energy signal as a function of total energy in the combined beam path; slit jaw drive means for varying the slit width; a source for producing a slit program signal which varies in a predetermined manner; means for generating an attenuator signal which varies as a function of attenuator position; a slit control circuit coupled to said total energy generating means and said attenuator signal generating means and having their outputs as inputs, and producing an output signal varying as the difference of said inputs; and means coupled to said slit control circuit and said source for combining a portion of said slit program signal with said output signal as an input to said drive means, with said portion being of a magnitude to control the slit width for low values of transmittance through the sample.

6. A double beam, optical null analyzer having a reference beam path attenautor control loop for varying the attenuator position as a function of transmittance through the sample, and a slit control loop for varying the slit jaw position as a function of total energy in the combined beam path, with the slit control loop including in combination: means for generating a total energy signal as a function of total energy in the combined beam path; slit jaw drive means for varying the slit width; a source for producing a slit program signal which varies in a predetermined manner; means for generating an attenuator signal which varies as a function of attenuator position; a slit control circuit coupled to said total energy signal generating means and said attenuator signal generating means and having their outputs as inputs, and producing an output signal varying as the difference of said inputs; and a series resistance-capacitance circuit coupled to said slit control circuit and said source for combining a portion of said slit program signal with said output signal as an input to said drive means, with said portion being of a magnitude to control the slit width for low values of transmittance through the sample.

7. A spectrophotometer comprising: a source of heterogeneous radiation; means for directing radiation from said source alternately through a reference and a sample to produce successively reference and sample beams of radiation, the combined reference and sample beams of radiation having a first component which is a function of the difference in energy in said reference and sample beams and a second component which is a function of the total energy in said beams; monochromator means in the path of said beams for selecting a narrow band of radiant energy in said beams and including variable slit jaws for controlling the total energy in said beams; radiation responsive means for converting radiant energy into an electrical signal positioned to receive the radiant energy selected by said monochromator; adjustable radiation attenuation means positioned in said reference beam; means for selecting from said electrical signal a first component which is a function of the difference in energy in said reference and sample beams; a first feedback circuit responsive to said first signal component connected to said adjustable radiation attenuation means for adjusting the energy in said reference beam to be equal to said sample beam; means for selecting from said electrical signal a second component which is a function of the total energy in said beams; means for producing a slit program signal for controlling the slit width; a second feedback circuit repsonsive to said second signal component and a signal representative of the position of said attenuation means for producing an output signal; slit jaw drive means coupled in said second feedback circuit and to said slit program signal producing means; said slit jaw drive means being responsive to said output signal for driving said slit jaws and maintaining the loop gain of said first feedback circuit constant regardless of variations in detectable energy in said reference beam when the transmittance of the sample is high and responsive to said slit program signal when the transmittance of the sample is low.

8. A spectrophotometer comprising: a source of heterogeneous radiation; means for directing radiation from said source alternately through a reference and a sample to produce successively reference and sample beams of radiation, the combined reference and sample beams of radiation having a first component which is a function of the difference in energy in said reference and sample beams and a second component which is a function of the total energy in said beams; monochromator means in the path of said beams for selecting a narrow beam of radiant energy in said beams and including variable slit jaws for controlling the total energy in said beams; radiation responsive means for converting radiant energy into an electrical signal positioned to receive the radiant energy selected by said monochromator; adjustable radiation attenuation means positioned in said reference beam; means for selecting from said electrical signal a first component which is a function of the differenc in energy in said reference and sample beams; a first feedback circuit responsive to said first signal component connected to said adjustable radiation attenuation means for adjusting the energy in said reference beam to be equal to said sample beam; means for selecting from said electrical signal a second component which is a function of the total energy in said beams; means for producing a slit program signal for controlling the slit width; means for driving said slit jaws; a second feedback circuit coupled to said driving means and responsive to said second signal component and a signal representative of the position of said attenuation means for actuating said driving means and driving said slit jaws and maintaining the loop gain of said first feedback circuit constant regardless of variations in detectable energy in said reference beam when the transmittance of the sample is high; said driving means also being coupled to said slit program producing means and being responsive to said slit program signal producing means when the transmittance of the sample is low.

References Cited in the file of this patent
UNITED STATES PATENTS
2,984,149    Herscher et al. _____ May 16, 1961